No. 727,222. PATENTED MAY 5, 1903.
C. M. SMITH.
STEERING APPARATUS FOR VEHICLES ON LOOP TRACKS.
APPLICATION FILED MAY 16, 1902.
NO MODEL. 2 SHEETS—SHEET 1.

Witnesses
B. N. Pierce
J. B. Marlin.

Inventor
Charles M. Smith
by
James R. Rogers
Attorney.

No. 727,222. PATENTED MAY 5, 1903.
C. M. SMITH.
STEERING APPARATUS FOR VEHICLES ON LOOP TRACKS.
APPLICATION FILED MAY 16, 1902.
NO MODEL. 2 SHEETS—SHEET 2.

Witnesses
B. N. Pierce
J. B. Martin

Inventor
Charles M. Smith
by James R. Rogers
Attorney

No. 727,222. Patented May 5, 1903.

UNITED STATES PATENT OFFICE.

CHARLES M. SMITH, OF LOS ANGELES, CALIFORNIA.

STEERING APPARATUS FOR VEHICLES ON LOOP-TRACKS.

SPECIFICATION forming part of Letters Patent No. 727,222, dated May 5, 1903.

Application filed May 16, 1902. Serial No. 107,627. (No model.)

*To all whom it may concern:*

Be it known that I, CHARLES M. SMITH, a citizen of the United States, residing at Los Angeles, in the county of Los Angeles, State of California, have invented and discovered a new and useful Improvement in Steering Apparatus for Vehicles on Loop-Tracks; and I do hereby declare the following to be a full, clear, and exact description of the invention, such as will enable others skilled in the art to which it appertains to make and use the same.

This invention relates to improvements in steering apparatus for vehicles intended to be operated on loop-tracks; and some of the objects of my improvement are, first, to provide an attachment for vehicles employed upon a single track; second, to afford means of safety to the operator of a bicycle or other vehicle while traveling over a single railway-track; third, to produce a steering device that can be readily attached and detached from the vehicle; fourth, to construct an attachment for vehicles that will obviate largely the friction between the attachment and the track; fifth, to produce an attachment for bicycles and other vehicles that combines amusement for the spectators and security to the operator over apparently perilous single loop-track railways. I attain these and other objects by the construction illustrated in the accompanying drawings, in which—

Figure 1:
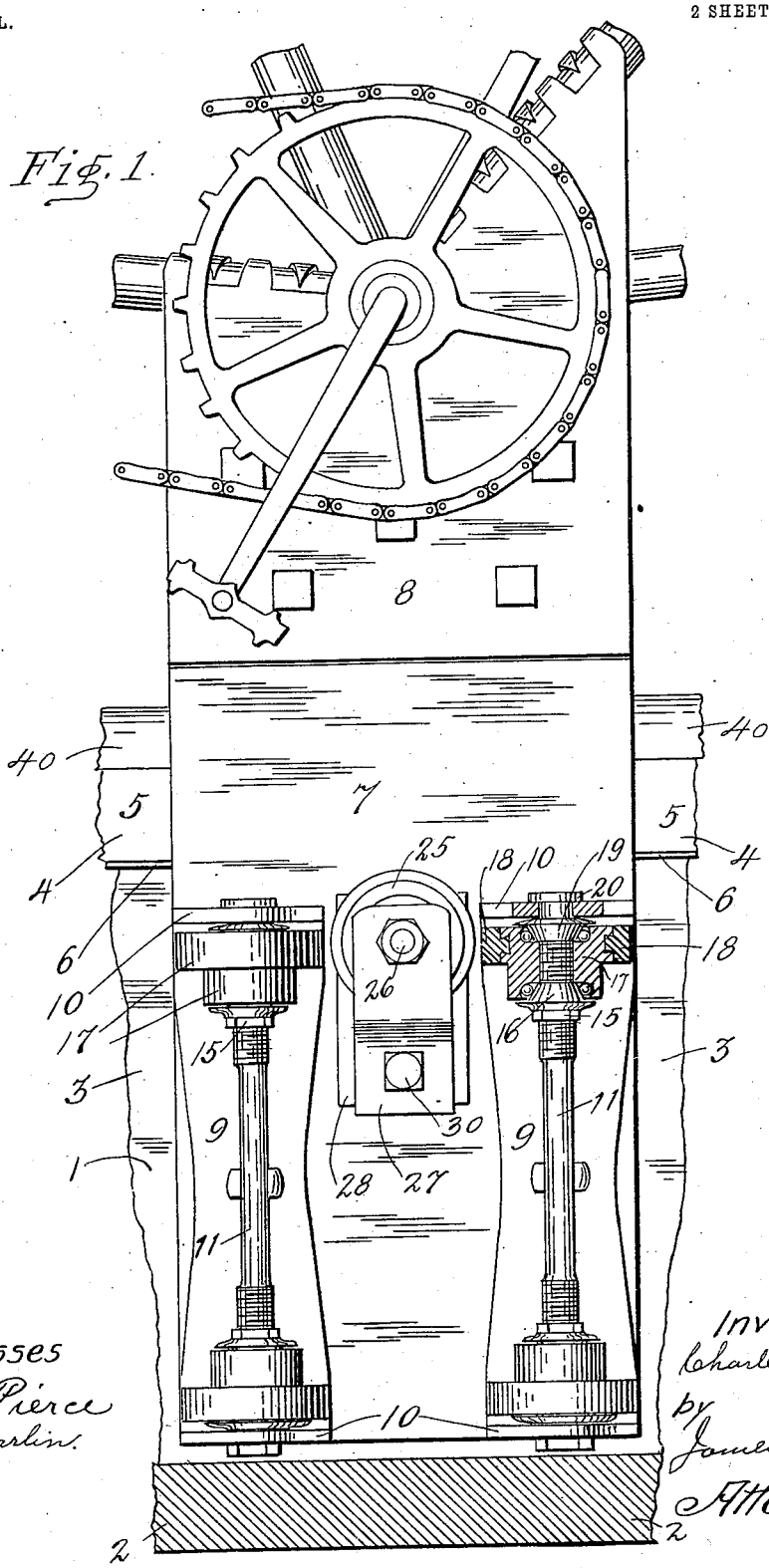
Figure 2:
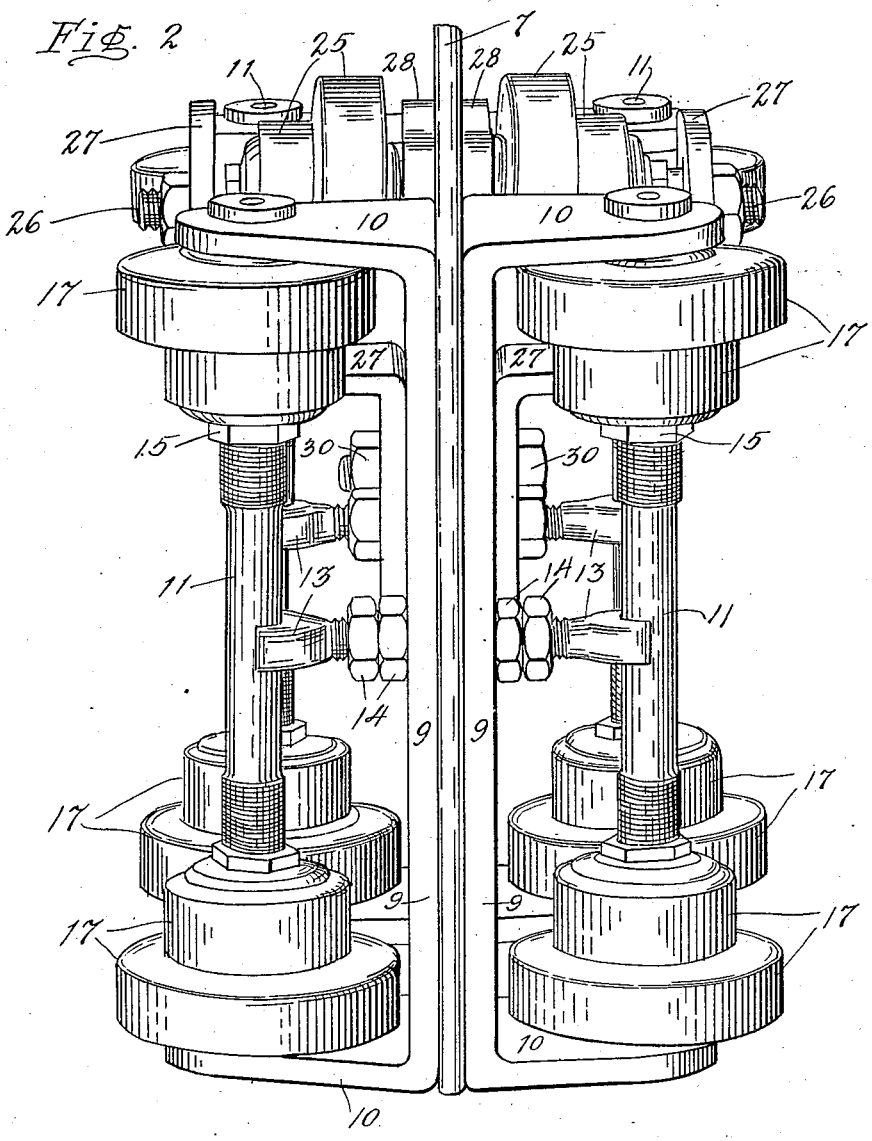

Figure 1 is a side view of the attachment secured to the frame of a bicycle, a portion of the antifriction devices shown in section, the frame partly broken away, and the track shown partly in elevation and partly in section; and Fig. 2 is a perspective view of the attachment-plate removed from the track and detached from the bicycle and the said plate by which the attachment is secured to the bicycle partly broken away.

Similar reference-numerals refer to like parts throughout both views.

The numeral 1 refers to the track, which consists of a rectangular box made in sections of any desired length, said sections adjusted, alined, and fastened together at their abutting ends to form a complete track of any desired length and of any required design, preferably with a loop or loops interposed between sections of the track and made integral therewith. Each section of the track is composed of a base-board 2, the two side boards 3, one of which is only shown in Fig. 1 of the drawings, and a cover 4, having a central longitudinal slot 5 in the longitudinal center thereof throughout the entire length of the cover, which is provided with two beaded strips 40, forming a path for the wheels of the bicycle. On the under face of the cover 4 and parallel with the longitudinal slot 5 are two protective strips 6 6, made of steel or other suitable material. These strips 6 6 project slightly into the longitudinal slot 5 from either side thereof and prevent the wood surface of the slot 5 from wear that would otherwise be caused by the plate 7, attached to the frame of the bicycle by means of the intermediate plate 8. To the said plate 7 are rigidly secured by rivets, bolts, and nuts or other suitable devices the brackets 9 9, having right-angle flanges 10, carrying the journals 11, on which the wheels 17 are revolved. Each of the four journals 11 carry two wheels 17, and the said journals have bearings at either end thereof in the right-angled flanges or wings 10 of the brackets 9 9. Said right-angled wings or flanges 10 are made integral with the body of the brackets 9 9. Projecting outwardly from the body portion of each of the brackets 9 9 and secured thereto by means of screw-threads and having adjusting-nuts 14 14 are the forked braces 13, one end of which is adapted to be screwed into a screw-threaded perforation in the body portion of the brackets 9 9. The other end of said braces 13 is curved or forked, into which curved or forked end of said braces the journals 11 rest, whereby the said journals 11 are held and braced in their proper position away from the body portion of the brackets 9 9. Each of the journals 11, at either end thereof, has a bearing in the outward-projecting right-angle flanges 10 of the brackets 9 9. The ends of the journals 11 are screw-threaded to receive the screw-threaded lock-nut 15, which is adjustably secured upon the ends of said journals, at some distance from the ends thereof.

The cone 16 is screw-threaded and made adjustable upon the screw-threaded ends of the journals 11 and is held in place thereon by means of said screw-threads and also by means of the screw-threaded lock-nuts 15. The flanged wheels 17 are provided with an extended hub and with a dovetailed rubber tire 18 at the opposite or enlarged end thereof, and upon the inner surface of the extended hub portion a cup is formed for the reception of balls or other antifriction devices with contact with the outer face or surface of the cone 16.

The enlarged end of the wheel 17 has formed upon the inner surface another cup for the reception of balls or like antifriction devices like that shown upon the extended hub portion of the wheel 17. These antifriction devices are in the enlarged portion of the wheel 17, which carries upon its periphery the rubber tire 18, which antifriction devices roll in contact with the internally-screw-threaded cone 19, screwed upon the reduced end of the journal 11. The said internally-screw-threaded cone 19 is provided with an overlapping flange 20, which rests upon the outer surface of the right-angled flange or wing 10 of the bracket 9. Against the external surface of the screw-threaded cone 19, within the wheel 17, the antifriction ball devices revolve. These rubber tires 18, secured upon the periphery of the wheel 17 by means of dovetailed groove, perform a very important function in that they prevent the noise and rattle that would otherwise be unpleasant to spectators assembled while the bicycle is being rapidly propelled over descending loop and ascending portions of the track. If these rubber tires were not fitted to the periphery of the wheel 17, the wooden surfaces of the wheel would be brought in contact at various points of the wooden track, thereby causing noise, which would manifestly disturb and annoy persons assembled for pleasure and amusement. The rubber tires may be dispensed with, and for these wheels made of wood or other suitable material can be substituted.

The wheels 25 have extended portions and are constructed in the same manner as the wheels 17 are made which are secured upon the vertical journals 11. The said wheels 25 are provided with antifriction devices in like manner as are the wheels 17 hereinbefore described. The said two wheels 25 revolve upon the one horizontal journal 26, and the said journal 26 has bearings at each end thereof in the brackets 27, which are secured to the opposite faces of the attachment-plate 7 between the two pairs of brackets 9 9, hereinbefore described, which last-mentioned brackets are attached to the edges of the attachment-plate 7 in pairs, and between each of the two said pairs of brackets 9 9 the brackets 27, one on either face of the attachment-plate 7, are secured thereto by means of screw-bolts 30. The said wheels 25 are provided with antifriction devices and dovetailed rubber tires identical in construction with the wheels 17 before referred to.

The horizontal journal 26 has a central bearing in the attachment-plate 7, and on either side of the attachment-plate 7 are two projecting blocks 28, of metal, through which the horizontal journal 26 passes and is journaled in said blocks. These blocks of metal on either face of the attachment-plate 7 serve the important function of removing the two wheels 25 away from the attachment-plate 7, so as to cause the said wheels 25 to be brought into contact with the protective strips 6 on the inclosed face or surface of the cover 5 of the track, at certain points within the loop portion thereof.

It is apparent that many variations and changes in the details of construction and arrangement of the parts hereinbefore described would readily suggest themselves to persons skilled in the art to which my improvement relates and said variations and changes would still be within the spirit and scope of my invention.

I do not desire to be limited or restricted to the exact construction and arrangement herein shown and described. It is not desired to confine this invention to the specific construction, combination, and arrangement of parts as hereinbefore described and the right is reserved to make all changes in and modifications of the same as come within the spirit of this invention.

The operation of this invention will be readily understood from the foregoing description when taken in connection with the drawings.

Having described my invention for which Letters Patent are desired, what I claim, and desire to secure by Letters Patent, is—

1. An attachment-plate for vehicles adapted for use upon a single-track railway, said plate carrying antifriction devices adapted to be operated within said railway-track, and the said plate adapted to travel within a slot over which the wheels of the vehicle vertically travel.

2. An attachment-plate secured to a vehicle constructed to be used upon a single-track railway, the said track provided with a central slot, said plate adapted to travel within the said slot, over which the wheels of the vehicle are constructed to vertically move, the said plate carrying antifriction devices adapted to be operated within the said track.

3. In a steering-plate for bicycles, adapted to be operated upon a single track provided with a central longitudinal slot therein, the said plate carrying antifriction devices within the said track, and the wheels of the bicycle adapted to vertically travel over the said slot in which the said plate moves.

4. In combined amusement-railway tracks and guiding devices for vehicles, a steering-plate for a vehicle, a single track having a central longitudinal slot therein, the said steering-plate carrying antifriction devices within the track, and adapted to travel in said slot in the same vertical plane as the vertical wheels of the vehicle move.

5. In combined amusement-railway tracks and guiding devices for vehicles, a steering-plate for a vehicle constructed for use upon a single track having vertical loop or loops interposed therein, provided with a central longitudinal slot in which the said plate moves and over which slot the wheels of the vehicle vertically travel.

6. In a steering apparatus for a bicycle, an attachment-plate carrying antifriction devices within the track, single rectangular box-track having a longitudinal slot throughout its entire length in the cover thereof, said attachment-plate adapted to travel within said slot and in the same plane as the vertical wheels of the bicycle, to which said attachment-plate is secured.

7. In steering apparatus for vehicles, an attachment-plate provided with brackets having bearings therein, the journals carrying antifriction devices secured in said brackets, a rectangular box-track having a slot therein in the cover thereof, said attachment-plate adapted to move in said slot and in the same plane of travel as the vertical wheels of the vehicle, to which the said plate is attached.

8. In combined track and steering apparatus for bicycles, a substantially closed rectangular box-track having a cover, a slot extending the entire length thereof, and an attachment-plate secured to a bicycle, adapted to travel in said slot, said plate carrying antifriction devices constructed to move within said box-track, the said plate arranged to vertically travel in said slot and the wheels of the bicycle adapted to vertically move over the said slot.

9. A combined amusement-track and steering apparatus for a bicycle, a closed rectangular box-track, a cover provided with a central longitudinal slot throughout the entire length thereof, a guide-plate secured to the frame of the bicycle, said plate carrying two sets of antifriction-rollers, one set adapted to revolve at right angles to the plane of revolution of the other set, said plate constructed to move in said slot over which the vertical wheels of the bicycle are adapted to vertically travel.

In testimony whereof I have signed my name to this specification in the presence of two subscribing witnesses.

CHARLES M. SMITH.

Witnesses:
AMELIA GUEST,
I. B. MARLIN.